(12) United States Patent
Lee et al.

(10) Patent No.: US 9,055,388 B2
(45) Date of Patent: Jun. 9, 2015

(54) PORTABLE TERMINAL AND METHOD FOR DISCOVERING WIRELESS DEVICES THEREOF

(75) Inventors: Kyung Min Lee, Suwon-si (KR); Jong Mu Choi, Gunpo-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 278 days.

(21) Appl. No.: 13/371,941

(22) Filed: Feb. 13, 2012

(65) Prior Publication Data

US 2012/0208462 A1 Aug. 16, 2012

(30) Foreign Application Priority Data

Feb. 11, 2011 (KR) .......................... 10-2011-0012282

(51) Int. Cl.
| | |
|---|---|
| *H04L 12/58* | (2006.01) |
| *H04M 1/725* | (2006.01) |
| *H04W 8/00* | (2009.01) |
| *H04W 84/18* | (2009.01) |

(52) U.S. Cl.
CPC .............. *H04W 8/005* (2013.01); *H04W 84/18* (2013.01)

(58) Field of Classification Search
CPC ..................................................... H04W 8/005
USPC ................................... 455/41.2, 412.1, 412.2
See application file for complete search history.

(56) References Cited

U.S. PATENT DOCUMENTS

| | | | | |
|---|---|---|---|---|
| 8,099,675 | B2 * | 1/2012 | Takamune | 715/772 |
| 2008/0242220 | A1 * | 10/2008 | Wilson et al. | 455/3.04 |
| 2012/0135683 | A1 * | 5/2012 | Lee et al. | 455/41.2 |

FOREIGN PATENT DOCUMENTS

KR  10-2011-0009875 A  1/2011

\* cited by examiner

*Primary Examiner* — Tuan H Nguyen
(74) *Attorney, Agent, or Firm* — Jefferson IP Law, LLP

(57) ABSTRACT

A portable terminal and a method for discovering wirelessly connectable devices are provided. The method includes requesting discovery of wirelessly connectable devices, discovering peripheral devices that are wirelessly connectable in at least one of a plurality of wireless communication schemes supported by the portable terminal, and displaying a list of the discovered devices. The method may discover and display peripheral devices capable of establishing a wireless communication connection in at least one of various wireless communication schemes supported by the portable terminal at one time to improve the convenience for a user. In addition, the method may display connectable wireless communication schemes together with a list of discovered devices to more easily establish a wireless communication connection in a desired scheme of the user.

20 Claims, 6 Drawing Sheets

PORTABLE TERMINAL AND METHOD FOR DISCOVERING WIRELESS DEVICES THEREOF

PRIORITY

This application claims the benefit under 35 U.S.C. §119 (a) of a Korean patent application filed on Feb. 11, 2011 in the Korean Intellectual Property Office and assigned Serial No. 10-2011-0012282, the entire disclosure of which is hereby incorporated by reference.

BACKGROUND OF THE INVENTION

1. Field of the Invention

The present invention relates to a method for discovering peripheral communication devices that are wirelessly connectable to a portable terminal. More particularly, the present invention relates to a portable terminal for discovering wirelessly connectable devices in at least one of various wireless communication schemes supported by the portable terminal, and for displaying the discovered devices in the form of a list, and a method for discovering devices thereof.

2. Description of the Related Art

In recent years, with the significant development of information and communication technology as well as semiconductor technology, the supply and use of all types of portable terminals have rapidly increased. More particularly, portable terminals have recently been developed in consideration of a mobile convergence stage to include traditional communication fields and other terminal fields. As a representative example of such a portable terminal, a mobile communication terminal provides various functions such as a TV watching function (e.g., mobile broadcasting such as Digital Multimedia Broadcasting (DMB) or Digital Video Broadcasting (DVB)), a music playing function (e.g., MPEG Audio Layer-3 (MP3)), a photographing function, a data communication function, an Internet access function, and a near distance wireless communication function as well as a general communication function such as a voice call or message transmission/reception.

There are Bluetooth, infrared communication, Zigbee, and wireless Local Area Network (LAN) schemes as representative examples of a wireless communication scheme for providing the near distance wireless communication function. Recent portable terminals generally use the Bluetooth and wireless LAN schemes. Additionally, in order to address the restriction of the wireless LAN scheme that provides a wireless communication connection with another terminal through an Access Point (AP), the Wi-Fi alliance has developed Wi-Fi Direct technology.

The Wi-Fi Direct technology was developed based on Wi-Fi technology, which enables terminals to establish a wireless communication connection without using the wireless LAN AP. As illustrated previously, recent portable terminals provide near distance wireless communication schemes such as Bluetooth, wireless LAN, and Wi-Fi Direct schemes.

However, a conventional portable terminal selects one of the various communication schemes and discovers peripheral terminals that are connectable considering only the selected scheme. This may cause a user to be unaware of the merits and demerits of respective wireless communication schemes, which results in an inconvenience for the user. For example, to transmit files stored in the user's portable terminal to another terminal, when the user does not know which wireless communication schemes the other terminal supports, the user must discover terminals in consideration of each wireless communication scheme until another terminal for connection is discovered. However, the user, who simply desires to transmit selected files to another terminal and may be inept at using electronic devices, is now required to understand a communication scheme for transmitting the files, which also results in an inconvenience.

SUMMARY OF THE INVENTION

Aspects of the present invention are to address at least the above-mentioned problems and/or disadvantages and to provide at least the advantages described below. Accordingly, an aspect of the present invention is to provide a portable terminal for discovering peripheral devices that are wirelessly connectable in at least one of various wireless communication schemes supported by the portable terminal when discovery of wirelessly connectable devices is requested, and displaying a list of the discovered devices, and a method for discovering devices thereof.

Another aspect of the present invention is to provide a portable terminal for classifying discovered devices by wireless communication schemes, to display a list of the discovered and classified devices, and a method for discovering a device thereof.

In accordance with an aspect of the present invention, a method for discovering devices of a portable terminal is provided. The method includes requesting discovery of wirelessly connectable devices, discovering peripheral devices that are wirelessly connectable in at least one of a plurality of wireless communication schemes supported by the portable terminal, and displaying a list of the discovered devices.

In accordance with another aspect of the present invention, a portable terminal for supporting a plurality of near distance wireless communication schemes is provided. The portable terminal includes a near distance wireless communication unit for performing a near distance wireless communication function, a controller for controlling the near distance wireless communication unit to discover peripheral devices that are wirelessly connectable in at least one of the plurality of near distance wireless communication schemes when discovery of devices that are wirelessly connectable to the portable terminal is requested, and a display for displaying a list of the discovered devices.

As illustrated previously, a portable terminal and a method for discovering devices thereof according to an exemplary embodiment of the present invention may discover and display peripheral devices capable of performing wireless connection in at least one of various wireless communication schemes supported by the portable terminal at one time to improve the convenience for a user. In addition, exemplary embodiments of the present invention may display connectable wireless communication schemes together with a list of discovered devices to more easily establish a wireless communication connection in a desired scheme of the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
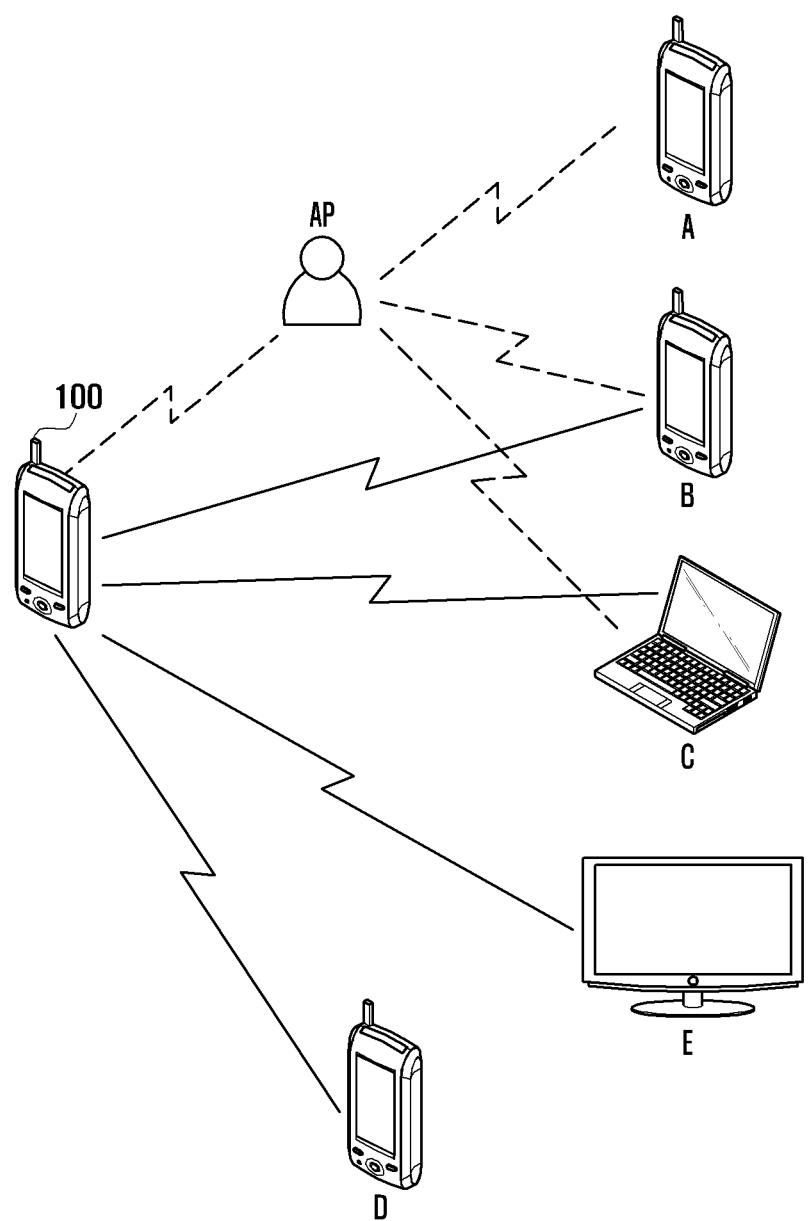
FIG. 1 is a schematic view illustrating a near distance wireless communication environment composed of a portable terminal and peripheral devices according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of exemplary embodiments of the invention, a mobile communication terminal is described by way of example. However, the present invention is not limited thereto. That is, the present invention is applicable to near distance wireless communication terminals connectable to another terminal in at least two schemes. For example, the present invention is applicable to a tablet Personnel Computer (PC), a Portable Multimedia Player (PMP), a navigation terminal, a Smart Phone, an Electronic Book, Ultra Mobile Personal Computer (UMPC), Internet Protocol TeleVision (IPTV), a printer, and the like.

The present invention is characterized in that it discovers peripheral communication devices that are wirelessly connectable in at least one of a plurality of wireless communication schemes supported by a portable terminal when discovery of wirelessly connectable devices is requested, and displays a list of the discovered peripheral devices that are wirelessly connectable on a display unit. For example, if a user selects a file for transmission and performs a file transmission function to transmit the file to another terminal, the portable terminal discovers peripheral devices that are wirelessly connectable in at least one of a plurality of wireless communication schemes (e.g., wireless Local Area Network (LAN), Wi-Fi Direct, Bluetooth, Zigbee, infrared communication schemes, and the like) supported by a portable terminal when discovery of wirelessly connectable devices is requested, and displays a list of the discovered peripheral wireless communication connectable devices on a display unit.

The peripheral wirelessly connectable devices may be simultaneously or sequentially discovered. For example, the portable terminal may sequentially discover connectable devices in wireless LAN, Wi-Fi Direct, and Bluetooth schemes.

FIG. 1 is a schematic view illustrating a near distance wireless communication environment composed of a portable terminal and peripheral devices according to an exemplary embodiment of the present invention. Hereinafter, for convenience of description, the portable terminal is described using a wireless LAN scheme or a Wi-Fi direct scheme by way of example. However, it is to be understood that this is not intended to limit application of any aspect or embodiment of the invention in any manner.

Referring to FIG. 1, a portable terminal 100 may establish a wireless communication connection with a plurality of peripheral devices A, B, C, D, and E. In this case, the peripheral device may be a mobile communication terminal, a notebook computer, a digital TV, a printer, a facsimile, and the like. For example, the portable terminal 100 may establish a wireless communication connection with the peripheral devices 'A', 'B', and 'C' using a wireless LAN scheme, namely, through a wireless LAN Access Point (AP), and establish a wireless communication connection with the peripheral devices 'B', 'C', 'D', and 'E' using a Wi-Fi Direct scheme. In an exemplary implementation, the portable terminal 100 first discovers a wireless LAN for wireless communication connection with the peripheral devices 'A', 'B', and 'C' in the wireless LAN scheme, and also discovers Wi-Fi Direct for wireless communication connection with the peripheral devices 'B', 'C', 'D', and 'E'.

In this case, although peripheral devices 'B', and 'C', which are connectable in either of two wireless communication schemes, may be discovered in a wireless LAN scheme or a Wi-Fi Direct scheme, the peripheral devices 'A', 'D', and 'E' may be discovered in only a corresponding scheme. For this reason, in the related art, when peripheral devices are discovered in only one discovering scheme selected by a user when discovery of peripheral devices is requested, there may arise a problem in that the user cannot discover a desired peripheral device for communication connection. For example, in a case where a user establishes a wireless communication connection with a peripheral device 'E', when a user is unaware of the wireless communication schemes with which the peripheral device 'E' can establish a communication connection with the portable terminal 100 and discovers a wireless LAN, the portable terminal 100 cannot find the peripheral device 'E'. More particularly, such a problem may cause the user, who may be inept at using electronic devices, an inconvenience. Accordingly, exemplary embodiments of the present invention provide for discovery of peripheral devices that are wirelessly connectable in at least one of a plurality of wireless communication schemes supported by a portable terminal 100, and display a list of the discovered peripheral devices to improve the convenience for a user.

Figure 2:
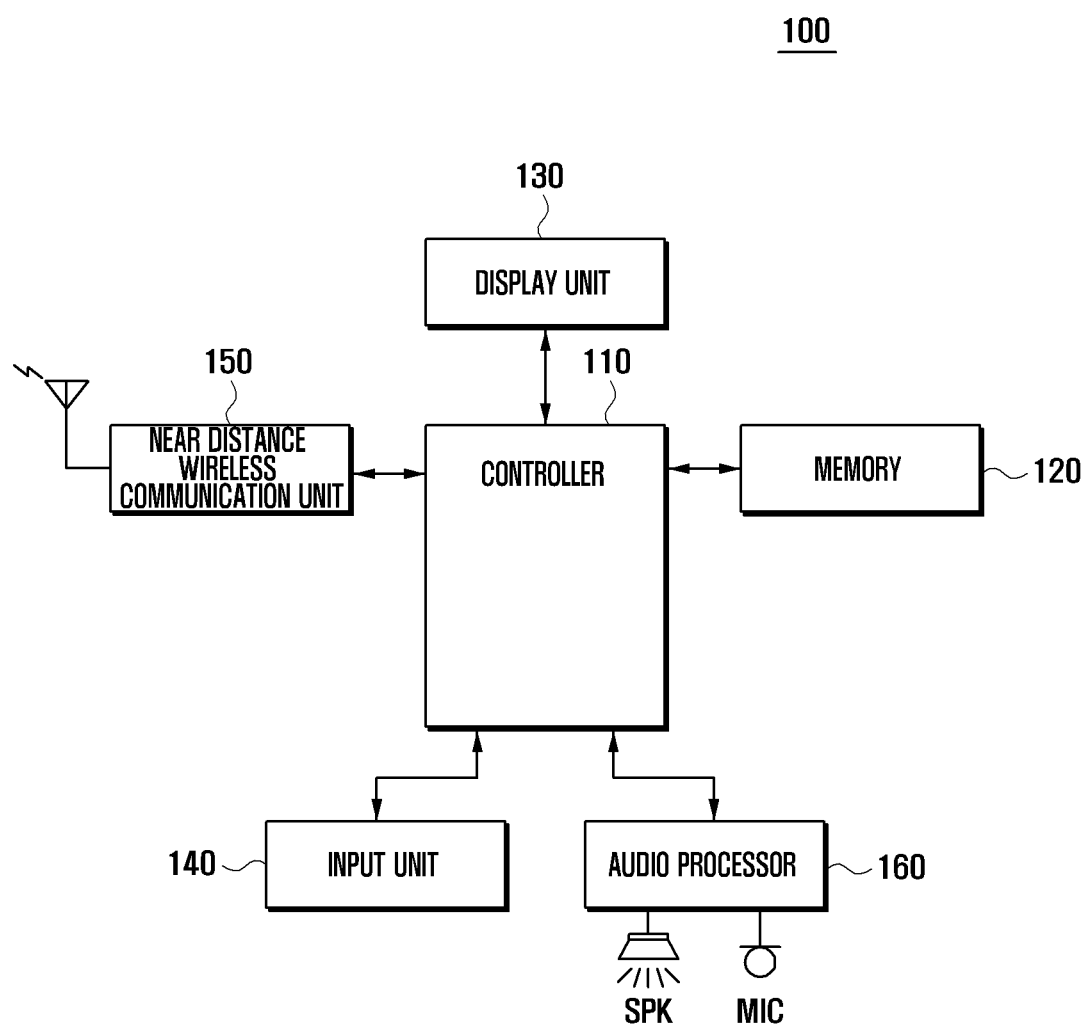
FIG. 2 is a block diagram illustrating a configuration of a portable terminal according to an exemplary embodiment of the present invention.

FIG. 2 is a block diagram illustrating a configuration of a portable terminal according to an exemplary embodiment of the present invention.

Referring to FIG. 2, the portable terminal 100 may include an audio processor 160, a near distance wireless communication unit 150, an input unit 140, a display unit 130, a memory 120, and a controller 110.

The audio processor 160 may be configured by a sound device for transmitting/receiving, encoding and decoding an audio signal. The audio processor 160 may include a codec and an audio amplifier. The audio processor 160 connects with a microphone (MIC) and a speaker (SPK). The audio processor 160 converts an analog voice signal input from the microphone into a digital voice signal, converts the digital voice signal into data, and transmits the data to the controller 110. The audio processor 160 may convert a digital voice signal input from the controller 110 into an analog voice signal, and output the analog voice signal through the speaker. Further, the audio processor 160 may output various audio signals generated by the portable terminal 100 through the speaker. For example, the audio processor 160 may output an audio signal according to playback of MP3 files and moving image files, a sound effect indicating that the discovery of the peripheral devices is completed, and a sound effect indicating that transmission of files is completed through the speaker.

The near distance wireless communication unit 150 is a device for providing a near distance wireless communication function, and enables wireless communication between terminals within a certain distance. The near distance wireless communication unit 150 may be configured by a wireless LAN module.

The wireless LAN module is a device for providing a wireless LAN service, which may form a communication channel with a wireless LAN AP to transmit/receive a wireless signal, and establish a Wi-Fi Direct wireless communication connection with another peripheral device (e.g., notebook computer, digital camera, digital TV, mobile communication terminal, Portable Multimedia Player (PMP), etc.) with a wireless LAN in one-to-one or in one-to-many. That is, the wireless LAN module may support the portable terminal 100 to establish a wireless communication connection with a peripheral device in a wireless LAN AP or a Wi-Fi Direct scheme.

The present invention is not restricted regarding the configuration of the near distance wireless communication unit 150 as a wireless LAN module. For example, the near distance wireless communication unit may be configured to have at least two of a plurality of near distance wireless communication schemes such as Bluetooth, Zigbee, infrared communication schemes, and the like.

The input unit 140 includes a plurality of input keys and function keys for receiving input of numeral or character information setting various types of functions, and controlling functions of the portable terminal 100. For example, the input unit 140 may include a call key for requesting a voice call, a video phone call key for requesting a video phone call, a termination key for requesting termination of the voice call or the video phone call, and a volume key and an arrow key for controlling an output volume of an audio signal. More particularly, the input unit 140 may transfer a signal for requesting the discovery of a peripheral device, a request for informing selection of a peripheral device from a list, and a signal for requesting a wireless communication connection to a selected peripheral device. The input unit 140 may be configured by one or a combination of input means such as a touch-pad, a touch-screen, a button type key pad, a joystick, a wheel key, and the like.

The display unit 130 displays information input by a user or information to be provided to the user as well as various menus of the portable terminal 100. For example, the display unit 130 may provide various screens such as an idle screen, a message creation screen, and a call screen according to the use of the portable terminal. More particularly, a display unit 130 may output a list of peripheral devices discovered under the control of the controller 110. The list may be displayed in various schemes. This will be described with reference to FIG. 4 to FIG. 6 in more detail. The display unit 130 may be configured by a Liquid Crystal Display (LCD), an Organic Light Emitted Diode (OLED), or an Active Matrix Organic Light Emitted Diode (AMOLED). If the display unit 130 is configured by a touch screen, it may perform a function of the input unit 140.

The memory 120 may store user data as well as a program necessary for a function operation according to an exemplary embodiment of the present invention. For example, the memory 120 may store a program for controlling an overall operation of the portable terminal 100, an Operating System (OS) for booting the portable terminal 100, and an application program necessary for other optional functions of the portable terminal 100 such as a camera function, a voice playback function, an image or moving image playback function, a near distance wireless communication function, a file transmission function, and a Digital Living Network Alliance (DLNA) service function. Further, the memory 120 may store user data according to use of the portable terminal 100, for example, character messages, game files, music files, movie files, and the like. More particularly, the memory 120 may store a peripheral device discovering program that discovers connectable peripheral devices in at least one of a plurality of wireless communication schemes supported by the portable terminal 100 when the discovery of the peripheral devices is requested, and displays a list of the discovered peripheral devices on a display unit 130. The peripheral device discovering program may simultaneously discover the peripheral devices in a plurality of wireless communication schemes or sequentially discover the peripheral devices in a preset order. The memory 120 may store a default wireless communication scheme to be used when wireless communication connection with a connectable peripheral device in at least two wireless communication schemes is requested. Accordingly, the portable terminal 100 may establish a wireless communication connection in a preset default scheme (e.g., wireless LAN scheme) when wireless communication connection with a connectable peripheral device in a wireless LAN scheme and a Wi-Fi Direct scheme is requested.

The controller 110 may control an overall operation of the portable terminal 100 and signal flow between internal blocks of the portable terminal 100. More particularly, when the discovery of a peripheral device is requested, the controller 110 may discover a wirelessly connectable peripheral device in at least one of a plurality of wireless communication schemes. For example, the controller 110 may activate a wireless LAN module to discover peripheral devices that are connectable using a wireless LAN scheme, namely, a wireless LAN AP, and to discover peripheral connectable devices through a Wi-Fi Direct scheme. The discovery of the peripheral devices may be requested through a menu or a preset function key. The discovery of the peripheral devices may be requested when a user performs a file transmission function after selecting a file.

When the discovery of the peripheral devices is terminated, the controller 110 may display a list of the discovered peripheral devices on a display unit 130. The list may be displayed in various schemes. This will be described with reference to FIGS. 4 to 6 in more detail below. If the user selects one peripheral device from the list of the discovered peripheral devices, the controller 110 may connect a wireless communication channel with the selected peripheral device.

The foregoing exemplary embodiment has illustrated that the peripheral devices are discovered using a wireless LAN module in two schemes composed of a wireless LAN scheme and a Wi-Fi Direct scheme by way of example. However, the present invention is not limited thereto. For example, a method for discovering a peripheral device according to an exemplary embodiment of the present invention is applicable to a portable terminal 100 that supports at least two of a plurality of near distance wireless communication schemes such as Bluetooth, Zigbee, infrared communication schemes, and the like.

Although not shown in FIG. 2, the portable terminal 100 may further include structural elements having additional functions such as a camera module for photographing an image or capturing moving images, a broadcast receiving module for receiving a broadcast, a digital sound source playing module such as an MP3 module, a wireless communication module for mobile communication or data communication, a proximity sensor module for proximity sensing, and the like. Since the structural elements can be variously changed according to a convergence trend of a digital device, no elements can be listed. However, the portable terminal 100 may include structural elements equivalent to the foregoing structural elements.

Figure 3:
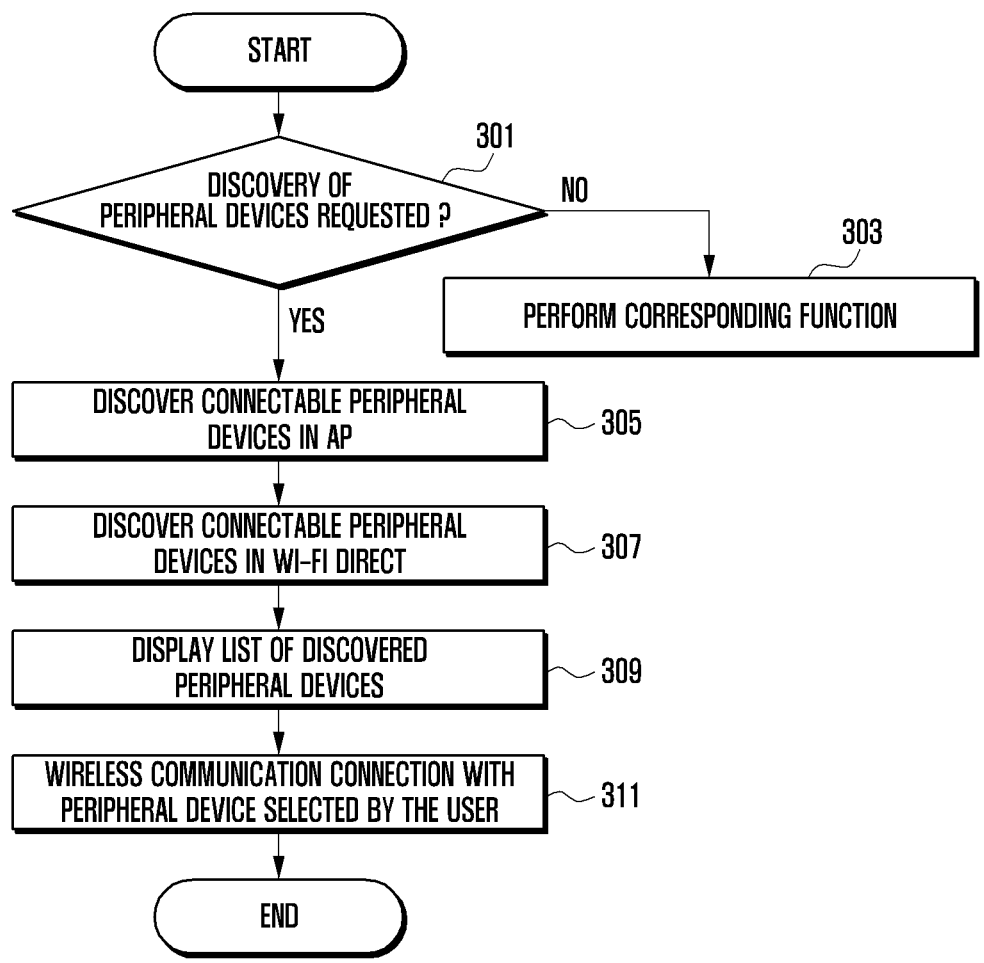
FIG. 3 is a flowchart illustrating a method for discovering peripheral devices of a portable terminal according to an exemplary embodiment of the present invention.
Figure 4:
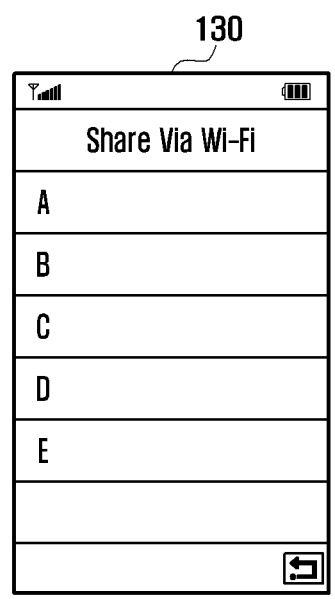
FIGS. 4 to 6 are views illustrating examples of a screen for describing display schemes of a list of discovered peripheral devices according to exemplary embodiments of the present invention.
Figure 5:
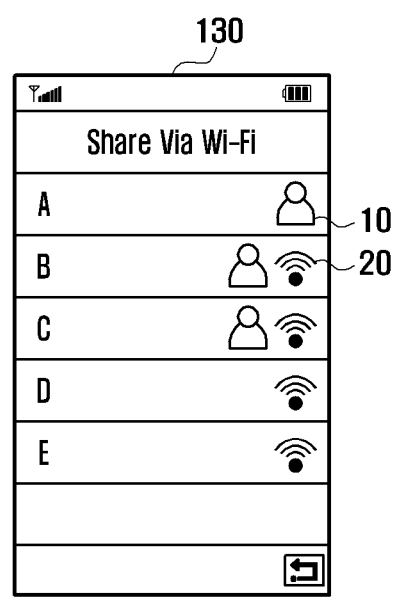
Figure 6:
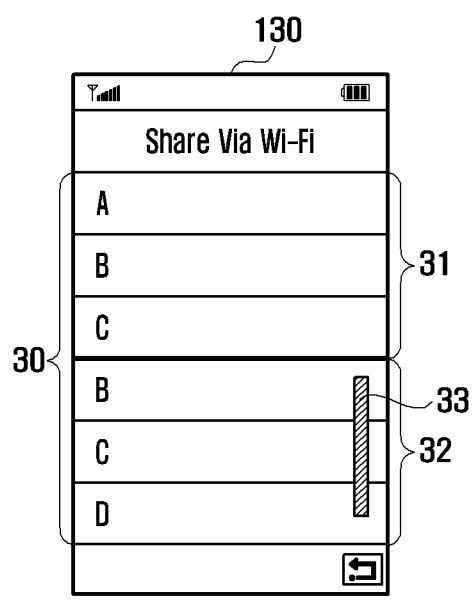

FIG. 3 is a flowchart illustrating a method for discovering peripheral devices of a portable terminal according to an exemplary embodiment of the present invention. FIGS. 4 to 6 are views illustrating examples of a screen for describing display schemes of a list of discovered peripheral devices according to exemplary embodiments of the present invention.

Referring to FIGS. 1 to 6, a controller 110 may determine whether discovery of peripheral devices is requested in step 301. The discovery of the peripheral devices may be requested through a menu or a preset function key. Meanwhile, the discovery of the peripheral devices may be requested when the user performs a file transmission function after selecting a file.

When the discovery of the peripheral devices is not requested, the controller 110 may perform a corresponding function in step 303. For example, the controller 110 may perform a music playback function, an Internet access function, a photographing function, and the like according to a request of the user. Conversely, when it is determined in step 301 that the discovery of the peripheral devices is requested, the controller 110 may activate a wireless LAN module to discover peripheral connectable devices in a wireless LAN scheme, namely, a wireless LAN AP in step 305, and discover the peripheral connectable devices in a Wi-Fi Direct scheme in step 307. In an exemplary implementation, step 305 and step 307 may be simultaneously performed.

When the discovery of the peripheral devices is terminated, the controller 110 may display a list of the discovered peripheral devices on a display unit 130 in step 309. The list may be displayed in various schemes. This will be illustrated in more detail later. If the user selects one peripheral device from the list of the discovered peripheral devices, the controller 110 may establish a wireless communication channel connection with the peripheral device selected by the user in step 311. The user may transmit a file to a connected peripheral device.

Exemplary display schemes of the list are described with reference to FIGS. 4 to 6. Referring to FIG. 4, the list display scheme according to a first exemplary embodiment of the present invention may list and display titles of discovered peripheral devices according to a preset rule (e.g., name order or signal strength order, etc.). In this case, the list displays peripheral devices (e.g., peripheral devices 'B', 'C' of FIG. 1) connectable in both of a wireless LAN scheme and a Wi-Fi Direct scheme with one item. In an exemplary implementation, an available default scheme may be previously set when requesting wireless communication connection with devices that are wirelessly connectable in the plurality of schemes. For example, in a case where the wireless LAN scheme is set to a default scheme, when the user selects a peripheral device 'B' from the list, the controller 110 may perform a control operation to establish a wireless communication connection with the peripheral device 'B' in a wireless LAN scheme. It is important to connect with a desired peripheral device in the list display scheme, but the list display scheme will be usable to a user who is not interested in a connection scheme. Although not shown, when wireless communication connection with a device that is wirelessly connectable in a plurality of schemes is requested, the controller 110 may perform a control operation to output a pop-up window such that a user may select a wireless communication scheme for connection. This will be available to a user knowing the merits and demerits of a particular wireless communication scheme, thus increasing the user's convenience.

Referring to FIG. 5, a list display scheme according to a second exemplary embodiment of the present invention may display an icon indicating a connectable wireless communication scheme with a corresponding peripheral device at a side of a corresponding item of the list. For example, in FIG. 5, a first icon 10 denotes a device connectable in a wireless LAN scheme, and a second icon 20 denotes a device connectable in a Wi-Fi Direct scheme. That is, referring to FIG. 5, it may be appreciated that a peripheral device 'A' may be connected in a wireless LAN scheme, peripheral devices 'B' and 'C' may be connected in the wireless LAN scheme and a Wi-Fi Direct scheme, and peripheral devices 'D' and 'E' may be connected in the Wi-Fi Direct scheme. The list display scheme may determine connection schemes of peripheral devices discovered by the user through the icon, and select (touch) an icon (e.g., first icon 10 and second icon 20) corresponding to a desired connection scheme to easily establish a wireless communication connection with a corresponding peripheral device in a desired wireless communication scheme.

In the meantime, a list display scheme according to a third exemplary embodiment of the present invention is characterized in that it divides a list display region on which the list is displayed into a plurality of regions corresponding to the number of a plurality of wireless communication schemes, and classifies and displays the discovered peripheral devices in the plurality of divided regions. In this case, the plurality of divided regions are scrollable. For example, as shown in FIG. 6, the controller 110 may perform a control operation to divide a list display region 30 into a first region 31 for displaying peripheral devices connectable in a wireless LAN scheme and a second region 32 for displaying the peripheral devices connectable in a Wi-Fi Direct scheme, to display peripheral devices 'A', 'B', and 'C' at the first region 31, and to display peripheral devices 'B', 'C', 'D', and 'E' at the second region 32. In this case, although the peripheral device 'E' is not shown at the second region 32 of FIG. 6, the user may select the peripheral device 'E' that is not displayed at the second region 32 through a scroll. A scroll bar 33 of FIG. 6 may be displayed when there is a peripheral device not displayed on a screen or at only the scroll time.

In the illustrated example, the first region 31 and the second region 32 are distinguished from each other based on a thick line in FIG. 6. However, the present invention is not limited thereto. For example, the first region 31 and a second region 32 may have different background colors and an icon indicating a corresponding wireless communication scheme may be displayed at a side of a corresponding region to distinguish the first region 31 and the second region 32 from each other.

The foregoing exemplary embodiments have illustrated that peripheral devices are discovered using two schemes; a wireless LAN scheme and a Wi-Fi Direct scheme. However, the present invention is not limited thereto. For example, the present invention is applicable to various portable terminals supporting at least two of a plurality of near distance wireless communication schemes such as Bluetooth, Zigbee, infrared communication schemes, and the like.

As illustrated previously, exemplary embodiments of the present invention may simultaneously or sequentially detect peripheral devices that are wirelessly connectable in at least one of various wireless communication schemes supported by a portable terminal, and display the discovered peripheral devices to improve the convenience for the user. In addition, exemplary embodiments of the present invention may more easily establish a wireless communication connection with a displayed peripheral device in a desired communication scheme of the user to enhance the convenience for the user.

A method for discovering peripheral devices of a portable terminal according to an exemplary embodiment of the present invention as described above may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for discovering devices by a portable terminal, the method comprising:
   discovering, when discovery of wirelessly connectable peripheral devices is requested, the wirelessly connectable peripheral devices that are wirelessly connectable in at least one of at least two wireless communication schemes supported by the portable terminal; and
   displaying a list of the discovered peripheral devices,
   wherein the discovering of the wirelessly connectable peripheral devices comprises discovering the wirelessly connectable peripheral devices using each of the at least two wireless communication schemes, and
   wherein the displaying of the list comprises displaying at least one icon indicating a type of connectable wireless communication scheme with the discovered peripheral devices at a side of each item.

2. The method of claim 1, further comprising establishing a wireless communication connection with a device selected from the list of the discovered peripheral devices.

3. The method of claim 1, wherein the discovering of the wirelessly connectable peripheral devices comprises:
   a first discovering procedure of discovering wirelessly connectable peripheral devices through a wireless local area network access point; and
   a second discovering procedure of discovering wirelessly connectable peripheral devices in a Wi-Fi Direct scheme.

4. The method of claim 1, wherein the displaying of the list comprises displaying a repeatedly discovered peripheral device, of the discovered peripheral devices, on the list as one item.

5. The method of claim 4, further comprising establishing a wireless communication connection with a connection requested device in a preset default wireless communication scheme of the at least two wireless communication schemes when a wireless communication connection with one of the repeatedly discovered peripheral devices is requested.

6. The method of claim 4, further comprising:
   outputting a pop-up window capable of selecting any one of the at least two wireless communication schemes when wireless communication connection with the repeatedly discovered peripheral device is requested; and
   establishing a wireless communication connection with the repeatedly discovered peripheral device in a wireless communication scheme selected from the pop-up window.

7. The method of claim 1, further comprising establishing a wireless communication connection with a selected peripheral device in a wireless communication scheme corresponding to a selected icon when the icon is selected.

8. The method of claim 1, wherein the displaying of the list comprises:
   dividing a region on which the list is displayed into a plurality of regions corresponding to the number of the at least two wireless communication schemes; and
   classifying and displaying the discovered peripheral devices in the plurality of divided regions according to a wireless communication scheme.

9. The method of claim 8, wherein the plurality of divided regions are scrollable.

10. The method of claim 1, wherein the discovering of the wirelessly connectable peripheral devices comprises one of:
    simultaneously discovering the wirelessly connectable peripheral devices in the at least two wireless communication schemes; and
    sequentially discovering the wirelessly connectable peripheral devices in the at least two wireless communication schemes.

11. A portable terminal for supporting a plurality of near distance wireless communication schemes, the terminal comprising;
    a near distance wireless communication unit for performing a near distance wireless communication function;
    a controller for controlling the near distance wireless communication unit to discover wirelessly connectable peripheral devices that are wirelessly connectable in at least one of the plurality of near distance wireless communication schemes when discovery of the wirelessly connectable peripheral devices is requested; and a display unit for displaying a list of the discovered peripheral devices, wherein the controller discovers the wirelessly connectable peripheral devices by discovering the wirelessly connectable peripheral devices using each of the plurality of near distance wireless communication schemes, and wherein the display unit displays the list by displaying at least one icon indicating a connectable wireless communication scheme with the discovered peripheral devices at a side of each item.

12. The portable terminal of claim 11, wherein the controller controls the near distance wireless communication unit to establish a wireless communication connection with a selected device when one device is selected from the list.

13. The portable terminal of claim 11, wherein the plurality of wireless communication schemes comprises a wireless Local Area Network (LAN) scheme connected through a wireless LAN access point, a Wi-Fi Direct scheme, Bluetooth, Zigbee, and infrared communication schemes.

14. The portable terminal of claim 11, wherein the display unit displays a repeatedly discovered peripheral device on the list as one item when the devices are discovered.

15. The portable terminal of claim 14, further comprising a memory for storing a default wireless communication scheme for connecting the repeatedly discovered peripheral device to the portable terminal when a wireless communication connection with the repeatedly discovered peripheral device is requested.

16. The portable terminal of claim 14, wherein the display unit outputs a pop-up window capable of selecting any one of the plurality of wireless communication schemes when a wireless communication connection with the repeatedly discovered peripheral device is requested.

17. The portable terminal of claim 11, wherein the controller establishes a wireless communication connection with a selected device in a wireless communication scheme corresponding to a selected icon when the icon is selected.

18. The portable terminal of claim 11, wherein the display unit classifies the discovered peripheral devices according to a wireless communication scheme when the list is output, and displays the classified peripheral devices at different regions, respectively.

19. The portable terminal of claim 11, wherein the plurality of divided regions are scrollable.

20. The portable terminal of claim 11, wherein the controller discovers the wirelessly connectable peripheral devices by simultaneously or sequentially discovering the wirelessly connectable peripheral devices in the plurality of wireless communication schemes.

* * * * *